United States Patent
Kaku (10) Patent No.: US 10,428,249 B2
(45) Date of Patent: Oct. 1, 2019

(54) ADHESIVE COMPOSITION AND FILM ROLL

(71) Applicant: DEXERIALS CORPORATION, Tokyo (JP)

(72) Inventor: Naomi Kaku, Tochigi (JP)

(73) Assignee: DEXERIALS CORPORATION, Tokyo (JP)

(*) Notice: Subject to any disclaimer, the term of this patent is extended or adjusted under 35 U.S.C. 154(b) by 0 days.

(21) Appl. No.: 15/032,548

(22) PCT Filed: Nov. 7, 2014

(86) PCT No.: PCT/JP2014/079601
§ 371 (c)(1),
(2) Date: Apr. 27, 2016

(87) PCT Pub. No.: WO2015/068811
PCT Pub. Date: May 14, 2015

(65) Prior Publication Data
US 2016/0272857 A1    Sep. 22, 2016

(30) Foreign Application Priority Data
Nov. 8, 2013    (JP) .................................. 2013-232238

(51) Int. Cl.
*C09J 163/00* (2006.01)
*C09J 11/06* (2006.01)
(Continued)

(52) U.S. Cl.
CPC ............. *C09J 163/00* (2013.01); *B29C 65/48* (2013.01); *C08L 33/068* (2013.01); *C08L 71/00* (2013.01);
(Continued)

(58) Field of Classification Search
CPC ........ C09J 7/00; C09J 7/0207; C09J 133/068; C09J 163/00; C09J 2433/00; C09J 171/00;
(Continued)

(56) References Cited

U.S. PATENT DOCUMENTS 5,500,462 A * 3/1996 Young ................ C08G 59/4021
427/386
5,755,905 A * 5/1998 Sinn ..................... B65H 18/103
156/184
(Continued)

FOREIGN PATENT DOCUMENTS

JP    2005-126658 A    5/2005
JP    2005-154687 A    6/2005
(Continued)

OTHER PUBLICATIONS

Machine translation of JP 2013-045994 A (2018).*
(Continued)

*Primary Examiner* — Kregg T Brooks
(74) *Attorney, Agent, or Firm* — Oliff PLC (57) ABSTRACT

An adhesive composition and a film roll whereby blocking can be prevented and excellent temporary pressure bonding properties can be obtained. The adhesive composition of the present invention contains an epoxy resin, a latent curing agent, and an acrylic rubber having a carboxyl group or a glycidyl group, and the acrylic rubber phase-separates from the epoxy resin at a normal temperature and is compatible with the epoxy resin at a predetermined temperature higher than the normal temperature and lower than the curing temperature. Adhesive force is thereby reduced at the normal temperature, blocking can be prevented from occurring and excellent adhesive force can be obtained during temporary pressure bonding.

5 Claims, 1 Drawing Sheet

(51) Int. Cl.
| | |
|---|---|
| *C09J 133/00* | (2006.01) |
| *C09J 163/02* | (2006.01) |
| *C09J 171/00* | (2006.01) |
| *C09J 171/10* | (2006.01) |
| *C09J 11/02* | (2006.01) |
| *C09J 133/06* | (2006.01) |
| *C09J 133/20* | (2006.01) |
| *C09J 5/06* | (2006.01) |
| *C09J 7/00* | (2018.01) |
| *C09J 7/35* | (2018.01) |
| *B29C 65/48* | (2006.01) |
| *H01R 11/01* | (2006.01) |
| *C09J 9/02* | (2006.01) |
| *C08L 33/06* | (2006.01) |
| *C08L 71/00* | (2006.01) |
| *C09J 7/38* | (2018.01) |
| *B29L 31/34* | (2006.01) |

(52) U.S. Cl.
CPC . *C09J 7/35* (2018.01); *C09J 7/38* (2018.01); *C09J 9/02* (2013.01); *C09J 133/068* (2013.01); *C09J 133/20* (2013.01); *B29L 2031/34* (2013.01); *C08G 2650/56* (2013.01); *C09J 2201/606* (2013.01); *C09J 2203/318* (2013.01); *C09J 2203/326* (2013.01); *C09J 2205/102* (2013.01); *C09J 2409/00* (2013.01); *C09J 2433/00* (2013.01); *C09J 2463/00* (2013.01)

(58) Field of Classification Search
CPC ..... C09J 7/35; C09J 7/38; C08L 63/00; C08L 33/068; C08L 71/00; B29C 65/48
See application file for complete search history.

(56) References Cited

U.S. PATENT DOCUMENTS

| | | | |
|---|---|---|---|
| 2006/0154078 | A1 | 7/2006 | Watanabe et al. |
| 2011/0031449 | A1* | 2/2011 | Enomoto ............ H01B 1/02 252/513 |
| 2011/0143501 | A1* | 6/2011 | Oda ............... C08L 63/00 438/127 |
| 2011/0256342 | A1 | 10/2011 | Toshioka et al. |
| 2012/0288659 | A1* | 11/2012 | Hoshi ............... C09J 133/20 428/41.8 |

FOREIGN PATENT DOCUMENTS

| | | | |
|---|---|---|---|
| JP | 2008-121005 | A | 5/2008 |
| JP | 2008-291171 | A | 12/2008 |
| JP | 2010-126642 | A | 6/2010 |
| JP | 2010-150362 | A | 7/2010 |
| JP | 2010-232422 | A | 10/2010 |
| JP | 2011-184528 | A | 9/2011 |
| JP | 2012-054518 | A | 3/2012 |
| JP | 2012-131903 | A | 7/2012 |
| JP | 2013-045994 | A | 3/2013 |
| JP | 2013-216833 | A | 10/2013 |

OTHER PUBLICATIONS

Feb. 24, 2015 Search Report issued in International Patent Application No. PCT/JP2014/079601.

Jan. 4, 2018 Office Action issued in Japanse Application No. 2013-232238.

* cited by examiner

ADHESIVE COMPOSITION AND FILM ROLL

TECHNICAL FIELD

The present disclosure relates to an adhesive composition for electrically and mechanically connecting an electronic component such as an IC chip to a substrate such as that of a liquid-crystal display panel or respective substrates such as flexible substrates or rigid substrates, and more particularly to a film roll in which an adhesive film is wound. This application claims priority to Japanese Patent Application No. 2013-232238 filed on Nov. 8, 2013, the entire content of which is hereby incorporated by reference.

BACKGROUND ART

Conventionally, anisotropic conductive film (ACF) is used as an adhesive film to electrically connect respective electronic components such as in connecting a liquid-crystal panel and an IC chip. This anisotropic conductive film is used, for example, to connect terminals of flexible print circuits (FPC) or IC chips to ITO (indium tin oxide) electrodes formed onto a glass substrate of an LCD panel and can be used both to bond and electrically connect a variety of respective terminals (for example, refer to PLT 1 and 2).

As an anisotropic conductive film, an epoxy resin type electrically insulating adhesive agent having conductive particles dispersed therein is generally used, for example, by conductive particles being trapped and deformed between a terminal of an IC chip and an ITO electrode of a glass substrate, the IC chip and the ITO electrode are electrically connected, and by curing the adhesive agent in this state, the IC chip and the ITO electrode are mechanically connected.

Such an adhesive film is formed onto a long and narrow release sheet and is shipped as a film roll wound around a reel in roll-form; at utilization time, the adhesive film is pulled off the reel and, after cutting to the needed length, used to connect electronic components.

At utilization time of a film roll, when unwinding an adhesive film from the reel, winding tension occurs. Stress caused by this winding tension increases towards the roll core. Furthermore, this stress increases along with increasing length of an adhesive film wound around a reel. In the case of this stress being too large, the adhesive agent component protrudes outside of the film roll and is deposited on flanges of the reel which causes blocking in which normal dispensing of the adhesive film from the reel is made impossible.

It is possible to prevent blocking by shortening the adhesive film to sufficiently reduce stress caused by winding tension of the film roll; however, this increases the frequency of reel replacement for which a line must be stopped each time, thus lowering productivity. Furthermore, while it may be possible to improve blocking properties by lowering adhesive force, this would adversely affect adhesive properties during temporary pressure bonding.

CITATION LIST

Patent Literature

PLT 1: Japanese Unexamined Patent Application Publication No. 2005-154687
PLT 2: Japanese Unexamined Patent Application Publication No. 2008-121005

SUMMARY OF INVENTION

Technical Problem

To solve the above-mentioned problems in the conventional art, the present disclosure provides an adhesive composition and a film roll for preventing blocking and which can achieve excellent temporary pressure bonding properties.

Solution to Problem

In order to solve the above-mentioned problem, an adhesive composition according to the present disclosure comprises an epoxy resin, a latent curing agent and an acrylic rubber having a carboxyl group or a glycidyl group, wherein the acrylic rubber phase-separates from the epoxy resin at normal temperature and is compatible with the epoxy resin at a predetermined temperature higher than normal temperature and lower than a curing temperature thereof.

Furthermore, a film roll according to the present disclosure comprises an adhesive film comprising an epoxy resin, a latent curing agent and an acrylic rubber having a carboxyl group or a glycidyl group in which the acrylic rubber phase-separates from the epoxy resin at a normal temperature and is compatible with the epoxy resin at a predetermined temperature higher than the normal temperature and lower than a curing temperature thereof, and a reel in which the adhesive film is wound around a roll core.

Still further, a method for manufacturing a connecting structure for connecting an electronic component according to the present disclosure comprises temporary pressure bonding in which an adhesive film comprising an epoxy resin, a latent curing agent and an acrylic rubber having a carboxyl group or a glycidyl group, wherein the acrylic rubber phase-separates from the epoxy resin at a normal temperature higher than a normal temperature and lower than a curing temperature thereof is held between a first electronic component and a second electronic component at a predetermined temperature, and final bonding the first electronic component and the second electronic component at a temperature equal to or higher than the curing temperature.

Advantageous Effects of Invention

According to the present disclosure, because the acrylic rubber phase-separates from the epoxy resin at the normal temperature and is compatible with the epoxy resin at a predetermined temperature higher than the normal temperature and lower than the curing temperature, occurrence of blocking can be prevented and excellent temporary pressure bonding properties can be achieved.

DESCRIPTION OF EMBODIMENTS

Embodiments according to the present disclosure (hereinafter referred to as embodiments) will now be described in detail according to the following order with reference to the accompanying drawings. It should be noted that the present invention is not limited to the embodiments described below and various modifications can be added to the embodiment without departing from the scope of the present invention. The features shown in the drawings are illustrated schematically and are not intended to be drawn to scale. Actual dimensions should be determined in consideration of the following description. Moreover, those skilled in the art will appreciate that dimensional relations and proportions may be different among the drawings in some parts.

1. Adhesive Composition and Film Roll

2. Examples

1. Adhesive Composition and Film Roll

Figure 1:
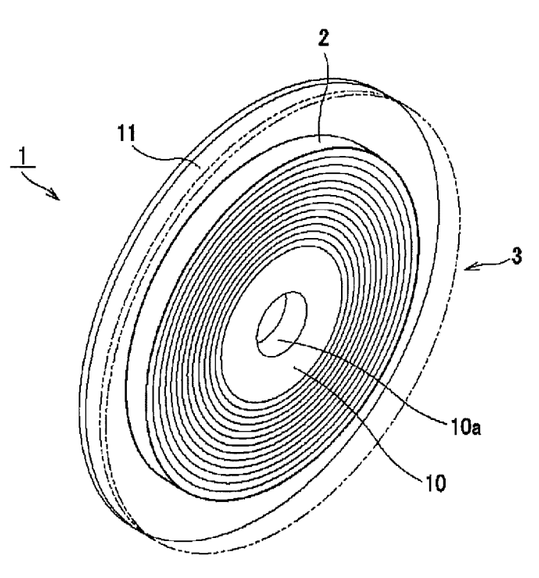
FIG. 1 is a perspective view of a film roll according to the present disclosure.

As illustrated in FIG. 1, a film roll 1 according to the present disclosure is formed by winding an adhesive film 2 around a reel 3.

The reel 3 includes a roll core 10 which is tube-shaped and which is for winding the adhesive film 2 and a flange 11 which is plate-shaped and provided on both ends of the roll core 10. The roll core 10 includes a shaft hole 10a through which a shaft can be inserted to enable rotation of the reel 3. One longitudinal direction edge portion of the adhesive film 2 is connected to the roll core 10 and the adhesive film 2 is wound therearound.

The roll core 10 and the flange 11 can be formed by using a variety of plastic materials, for example. Surfaces of the flange 11 which contact the adhesive film 2 may be electrostatically treated. Methods for electrostatic treatment include, for example, applying a compound such as a polythiophene to the flange 11.

Examples of the adhesive film 2 wound around the reel 3 to constitute the film roll 1 include anisotropic conductive film (ACF) used in such applications as COG mounting in which an electronic component is mounted to a substrate such as a circuit substrate and FOG mounting in which respective substrates are connected, adhesive agent film (NCF: non-conductive film) and conductive adhesive film used to connect tabbing wires to electrodes of solar cells, among others.

The adhesive film 2 is, for example, provided as an adhesive agent layer formed onto a release film. The release film, for example, is formed in a tape shape by applying a release agent such as silicone to a base material. The release film prevents drying of the adhesive film and also maintains the shape of the adhesive film. Examples of usable base materials for the release film include PET (poly ethylene terephthalate), OPP (oriented polypropylene, PMP (4-methylpentene-1) and PTFE (polytetrafluoroethylene), among others.

In this embodiment, the adhesive composition constituting the adhesive film 2 contains an epoxy resin, a latent curing agent, and an acrylic rubber having a carboxyl group or a glycidyl group, and the acrylic rubber phase-separates from the epoxy resin at a normal temperature and is compatible with the epoxy resin at a predetermined temperature higher than the normal temperature and lower than a curing temperature thereof. Thus, an adhesive force in the adhesive composition at the normal temperature is lower than the adhesive force at the predetermined temperature. Therefore, because tack and fluidity are low at the normal temperature, even in the case of a lengthened adhesive film, protrusion in the winding core vicinity is unlikely to occur. Because compatibility is improved at a predetermined temperature such as, for example, a temporary attachment temperature, a tack enabling temporary pressure bonding can be achieved. For example, when positioning an anisotropic conductive film at the normal temperature, in the case of temporary pressure bonding at approximately 50° C., because tack is low at the normal temperature, re-attachment is made easy thereby enabling improvement in work efficiency.

Additionally, in the adhesive composition having the acrylic rubber which phase-separates from the epoxy resin at normal temperature and is compatible with the epoxy resin at the predetermined temperature, a transmittance at the normal temperature is lower than a transmittance at the predetermined temperature. Under normal conditions in a phase-separated state, each component in a mixed system forms a domain and light is scattered at domain interfaces, thereby reducing light transmittance. In contrast, if compatibility is improved, domains are reduced in size or eliminated, thereby increasing light transmittance.

It should be noted that in the present disclosure, normal temperature is as defined by the Japanese Industrial Standard (JIS Z 8703) to be 20° C.±15 (5 to 35° C.).

In view of rapid curing, a bifunctional epoxy resin is desirably used as the epoxy resin. Examples of bifunctional epoxy resins include bisphenol type epoxy resins such as bisphenol A type epoxy resins, bisphenol F type epoxy resins and bisphenol S type epoxy resins; bifunctional epoxy resins having a naphthalene skeleton such as diglycidyl ether of 1,4-dihydroxynaphthalene, diglycidyl ether of 1,5-dihydroxynaphthalene, diglycidyl ether of 1,6-dihydroxynaphthalene, diglycidyl ether of 2,6-dihydroxynaphthalene, diglycidyl ether of 2,7-dihydroxynaphthalene and diglycidyl ether of 1,1-bi-2-naphthol; biphenol type epoxy resins such as diglycidyl ether of 4,4'-biphenol and diglycidyl ether of 3,3',5,5'-tetramethyl-4,4'-biphenol; diglycidyl ethers of monocyclic bifunctional phenols such as catechol, resorcinol and hydroquinone; epoxy resins such as diglycidyl ether of bisphenol fluorene, diglycidyl ether of bisphenol acetophenone, dihydroxybiphenyl ether and diglycidyl ether of dihydroxybiphenyl thioether; epoxy resins such as those having diglycidyl ethers of bifunctional alcohols such as cyclohexanedimethanol, 1,6-hexanediol and neopentyl glycol; epoxy resins such as those having diglycidyl esters of dicarboxylic acid such as phthalic acid, isophthalic acid, tetrahydrophthalic acid and hexahydrophthalic acid. Substituents having no adverse effect such as alkyl groups, aryl groups, ether groups and ester groups, among others, may be substituted in these bifunctional epoxy resins and these bifunctional epoxy resins can be used individually or in a combination of two or more. Among these, a bisphenol type epoxy resin is particularly suitable for use in this embodiment.

Examples of usable latent curing agents include imidazole types, hydrazide types, aminimides and dicyandiamide and such acid-generating agents as antimony, phosphorus or fluorine types, among others. These may be used individually or in a combination of two or more. Among these, a microcapsule type in which the surfaces of imidazole compound particles are coated with a cured polymer material such as that of polyurethane or polyester are particularly suitable in this embodiment.

Blending amount of the latent curing agent, with respect to 100 pts. mass epoxy resin, is preferably 10 to 200 pts. mass and more preferably 80 to 120 pts. mass. This can thereby achieve a sufficient reaction rate in the curing reaction.

The acrylic rubber is a copolymer having a carboxyl group or a glycidyl group and contains, for example, an acrylic acid ester and acrylonitrile as primary constituents and one or more of acrylic acid, methacrylic acid, glycidyl acrylate and glycidyl methacrylate, among others. Amount of these acrylic monomers having a functional group is preferably from 0.5 wt. % to 10 wt. %. By thus including a carboxyl group or glycidyl group, compatibility with the epoxy resin can be improved.

Examples of the acrylic acid ester include alkyl (meth) acrylates such as ethyl acrylate (Tg=−22° C., hereinafter expressed as temperature only in parenthesis), n-propyl acrylate (−37° C.), n-butyl acrylate (−54° C.), isobutyl acrylate (−24° C.), sec-butyl acrylate (−21° C.), n-hexyl acrylate (−57° C.), 2-ethylhexyl acrylate (−85° C.), n-octyl ethyl methacrylate (−25° C.), iso-octyl acrylate (−45° C.), n-nonyl methacrylate (−35° C.) and n-decyl methacrylate (−45° C.); conjugated diene monomers containing four to six carbon atoms such as butadiene; and vinyl ethers such as methyl vinyl ether (−31° C.), ethyl vinyl ether (−33° C.) and propyl vinyl ether (−49° C.), among others. These monomers may be used individually or in a combination of two or more; however, in view of glass transition temperature adjustment, adhesiveness and economic efficiency, use of a (meth) acrylate monomer is particularly suitable.

The glass transition temperature Tg of the acrylic rubber is preferably lower than a predetermined temperature which is lower than the curing temperature. For example, a preferable glass transition temperature Tg for the acrylic rubber is 50° C. or less. In the case of a glass transition temperature exceeding 50° C., structural phase transition does not occur during pressure bonding and it is difficult to obtain favorable adhesive force in a cured product.

It should be noted that the glass transition temperatures Tg of the acrylic rubber can be measured by using DSC (differential scanning calorimetry). Moreover, the glass transition temperature Tg can be calculated by Formula (1) (Fox equation) as given below.

$$1/Tg = W1/T1 + W2/T2 + \ldots Wn/Tn \quad (1)$$

In Formula (1), W1, W2 . . . Wn represent mass fractions for each monomer and T1, T2 . . . Tn represent glass transition temperatures (K) for each monomer.

Furthermore, a weight-average molecular weight Mw for the acrylic rubber from $5.0 \times 10^5$ to $1.2 \times 10^6$ is particularly suitable. In the case of a small weight-average molecular weight Mw, reduced cohesive force in an adhesive system leads to difficulties in obtaining a high adhesive force. In the case of an overly large weight-average molecular weight Mw, compatibility with other constituents is reduced. It should be noted that the weight-average molecular weight Mw can be calculated in terms of styrene by GPC method.

The content of the acrylic rubber is preferably from 60 pts. mass to 40 pts. mass per 100 pts. mass of the epoxy resin. In the case of acrylic rubber content being less than 40 pts. mass, a suitable adhesive force is difficult to achieve during pressure bonding and connection reliability properties are adversely affected. Furthermore, in the case of acrylic rubber content being greater than 60 pts. mass, adhesive force is increased at the normal temperature thereby causing blocking to occur.

The adhesive composition preferably has delayed tack and, after heating to the predetermined temperature and leaving to stand for one hour, this adhesive force is preferably higher than an adhesive force at the normal temperature. It is thereby possible to maintain a high tack from temporary pressure bonding to final pressure bonding and this prevents such problems as displacement during final pressure bonding. It should be noted that delayed tack is a property of having non-adhesiveness (or low adhesiveness) at the normal temperature and adhesiveness is generated by heating; then, even after removing the heat source, adhesiveness is maintained over a long time period.

Furthermore, the adhesive composition preferably contains a film-forming resin. The film-forming resin has an average molecular weight of 10000 or more corresponding to a high molecular weight resin and, in view of film forming properties, preferably has a molecular weight of approximately 10000 to 80000. Examples of usable film-forming resins include phenoxy resins, polyester resins, polyurethane resins, polyester urethane resins, acrylic resins, polyimide resins and butyral resin, among a variety of other resins, and these may be used individually or in a combination of two or more. Among these, in view of such properties as resin-formed states and connection reliability, a phenoxy resin is particularly suitable for use. Content of the film-forming resin is preferably from 80 pts. mass to 120 pts. mass per 100 pts. mass epoxy resin.

Furthermore, in order to improve connection properties between interfacing surfaces of the adhesive composition and an inorganic material, a silane coupling agent is preferably included. Examples of the silane coupling agent include epoxy-type, methacryloxy-type, amino-type, vinyl-type, mercapto sulfide-type and ureido-type, among others, and these may be used individually or in a combination of two or more. Among these, in this embodiment, an epoxy-type silane coupling agent is favorably used. Furthermore, to control fluidity and for stress relaxation, the adhesive composition preferably includes a rubber constituent such as a butadiene rubber. Still further, the adhesive composition may also include an inorganic filler.

Moreover, in order to use the adhesive composition as an anisotropic conductive adhesive, conductive particles may be included. Known conductive particles used in anisotropic conductive films may be used as the conductive particles. Examples of these conductive particles include particles of metals or metal alloys such as those of nickel, iron, copper, aluminum, tin, lead, chromium, cobalt, silver and gold or particles such as those of metal oxides, carbon, graphite, glass, ceramics and plastics coated with metal, and these particles further coated with a thin electrically-insulating film. In the case of coating a metal to the surface of resin particles, usable resin particles include those made of epoxy resins, phenol resins, acrylic resins, acrylonitrile-styrene (AS) resin, benzoguanamine resin, divinylbenzene-type resin and styrene-type resin, among others.

Average particle diameter of the conductive particles is normally 1 to 10 μm and more preferably 2 to 6 μm. Furthermore, average particle density of the conductive particles in the binder resin, in view of connection reliability properties and insulating reliability properties, is preferably 1000 to 100000 particles/mm² and more preferably 30000 to 80000 particles/mm². An anisotropic conductive adhesive agent having the conductive particles is applicable to a variety of uses including COG, COB, FOG, FOB and FOF, among others, without particular limitation.

In an adhesive composition so configured, because the acrylic rubber phase-separates from the epoxy resin at the normal temperature and is compatible with the epoxy resin at a predetermined temperature which is higher than the normal temperature and lower than the curing temperature, occurrence of blocking can be prevented and excellent temporary bonding properties can be obtained.

A method for manufacturing a connecting structure will now be explained. A method for manufacturing a connecting structure for connecting an electronic component according to this embodiment comprises temporary pressure bonding in which an adhesive film comprising an epoxy resin, a latent curing agent and an acrylic rubber having a carboxyl group or a glycidyl group, wherein the acrylic rubber phase-separates from the epoxy resin at a normal temperature higher than a normal temperature and lower than a curing temperature thereof is held between a first electronic component and a second electronic component at a predetermined temperature, and final bonding the first electronic component and the second electronic component at a temperature equal to or higher than the curing temperature.

The adhesive film can be used in a variety of applications; however, in the cases of the first electronic component being, for example, such a component as a printed-wiring board (PWB) or a liquid crystal panel, and the second electronic component being, for example, such a component as a flexible printed circuit board (FPC), a tape carrier package (TCP) substrate or a chip-on-film (COF) substrate, it is preferable to blend conductive particles and use the adhesive film as an anisotropic conductive film. Furthermore, the adhesive film can be used as an anisotropic conductive film having conductive particles blended therein to connect tabbing wires to electrodes of solar cells in a solar cell module.

As illustrated in FIG. 1, in a film roll 1, when connecting electronic components, an adhesive film 2 is pulled from a reel 3 and, after being cut to a needed length, is supplied for connecting the electronic components. At this time, even in the case of occurence of stress caused by winding tension, because fluidity is low in a binder of the film 2, protrusion caused by stress due to the winding tension can be suppressed. Furthermore, because tack is low in the binder of the adhesive film 2, the adhesive film 2 easily releases from a release sheet. This thereby prevents blocking in which the binder constituent is deposited on a flange 11 which makes normal dispensing of the adhesive film 2 impossible.

After being cut to a predetermined length, the adhesive film 2 is temporarily pasted between the first electronic component and the second electronic component. At this time, because thermo-compression is applied by a thermo-compression head at a predetermined pressure for a predetermined time, fluidity and adhesive properties are improved. Temperature during temporary pressure bonding is a predetermined temperature higher than the normal temperature and lower than the curing temperature and is, for example, preferably from 40 to 80° C. Furthermore, in the adhesive film according to this embodiment, even after removing the thermocompression head, adhesive properties are maintained over a long time period and occurrence of displacement before final pressure bonding can be prevented.

After temporary pressure bonding, the connecting structure, which does not displace, is thermally compressed by the thermocompression head at a predetermined pressure and a predetermined time for final pressure bonding. Temperature during final pressure bonding, while depending on the composition of the binder, is normally from 160 to 210° C. Along with the binder flowing out from between both electrodes of the first electronic component and the second electronic component, conductive particles are thereby trapped between both electrodes and the binder is cured in this state. A connecting structure is thereby obtained in which terminals of the first electronic component and the second electronic component are connected via the conductive particles.

4. Examples

Examples

Examples of the present disclosure will now be described. In these examples, as the adhesive film, ACF was manufactured in which an acrylic rubber was blended, during dispensing of the ACF, occurrence of blocking, transmittance, peel strength and connection reliability were evaluated. It should be noted that the present invention is not limited to these examples.

Occurrence of Blocking

ACF having a length of 300 m was wound under conditions of 20 g of winding force to a reel having a core axis diameter of 85 mm and having flanges on both sides made of polystyrene having an average thickness of 1.5 mm. After winding onto the reel, a load of 50 g of pulling force was applied to the ACF under a temperature condition of 30° C. and the occurrence or non-occurrence of blocking was visually observed.

Examples in which blocking did not occur for a period of 12 hours after load application to the ACF were evaluated as passing (hereinafter represented as P). Examples in which blocking occurred in a period from 6 to 12 hours after load application to the ACF were evaluated as intermediate (hereinafter represented as I). Examples in which blocking occurred within 6 hours of load application to the ACF were evaluated as failing (hereinafter represented as F).

Transmittance Measurement

A spectrophotometer (CM3600D manufactured by Konica Minolta, Inc.) was used to measure transmittance by irradiating light having a 600 nm wavelength to the ACF in an uncured state under a 23° C. atmosphere and a 50° C. atmosphere. Thickness of the ACF was 25 μm.

Peel Strength Measurement

An ACF having a 1.0 mm width and a 25 μm thickness was used to pressure bond a substrate (FD-4, 1.0 mm thickness, 200 μm P (LS=1/1), 35 μm t Cu wiring (Ni/Au plating)) and a flexible substrate (a 25 μm thick polyimide, 200 μm P (LS=1/1), 12 μm t Cu wiring (Ni/Au plating)).

As a measure of re-attachment properties, after pressure bonding the substrate to the flexible substrate with pressure bonding conditions of 3 Mpa at 23° C. for 10 seconds, 90° peel strength (JIS K6854-1) was measured by using a peel tester (Tensilon manufactured by Oriontec) under a 23° C. atmosphere. Peel speed was 50 mm/min.

In evaluating peel strength when re-attaching, a 90° peel strength of less than 0.5 N/cm was evaluated as passing (hereinafter represented as P), a 90° peel strength of more than 0.5 N/cm and less than 1.0 N/cm was evaluated as intermediate (hereinafter represented as I) and a 90° peel strength of 1.0 N/cm or more was evaluated as failing (hereinafter represented as F).

Furthermore, in temporary pressure bonding, one minute after pressure bonding the substrate and the flexible substrate under pressure bonding conditions of 3 Mpa at 50° C. for 10 seconds, 90° peel strength (JIS K6854-1) was measured by using a peel tester (Tensilon manufactured by Oriontec) under a 23° C. atmosphere. Peel speed was 50 mm/min.

In evaluating peel strength when temporary pressure bonding, a 90° peel strength of 1.0 N/cm or more was evaluated as passing (hereinafter represented as P), a 90° peel strength of 0.5 N/cm or more and less than 1.0 N/cm was evaluated as intermediate (hereinafter represented as I) and a 90° peel strength of less than 0.5 N/cm was evaluated as failing (hereinafter represented as F).

Furthermore, in temporary pressure bonding, one hour after pressure bonding the substrate and the flexible substrate under pressure bonding conditions of 3 Mpa at 50° C. for 10 seconds, 90° peel strength (JIS K6854-1) was measured by using a peel tester (Tensilon manufactured by Orientec) under a 23° C. atmosphere. Peel speed was 50 mm/min.

In evaluating peel strength of delayed tack, a 90° peel strength of 1.0 N/cm or more was evaluated as Passing (hereinafter represented as P), a 90° peel strength of 0.5 N/cm or more and less than 1.0 N/cm was evaluated as intermediate (hereinafter represented as I) and a 90° peel strength of less than 0.5 N/cm was evaluated as failing (hereinafter represented as F).

Moreover, in evaluating final pressure bonding properties, after pressure bonding the substrate to the flexible substrate with pressure bonding conditions of 3 Mpa at 190° C. for 10 seconds, 90° peel strength (JIS K6854-1) was measured by using a peel tester (Tensilon manufactured by Oriontec) under a 23° C. atmosphere. Peel speed was 50 mm/min.

In evaluating peel strength at the time of final pressure bonding, a 90° peel strength of 8.0 N/cm or more was evaluated as passing (hereinafter represented as P), a 90° peel strength of 4.0 N/cm or more and less than 8.0 N/cm was evaluated as intermediate (hereinafter represented as I) and a 90° peel strength of less than 4.0 N/cm was evaluated as failing (hereinafter represented as F).

Electrical Resistance Measurement

Using an ACF having a 1.0 mm width and a 25 μm thickness, final pressure bonding of a substrate (FD-4, 1.0 mm thickness, 200 μm P (LS=1/1), 35 μm t Cu wiring (Ni/Au plating)) and a flexible substrate (a 25 μm thick polyimide, 200 μm P (LS=1/1), 12 μm t Cu wiring (Ni/Au plating)) was performed under bonding conditions of 3 MPa at 190° C. for 10 seconds after temporary pressure bonding was performed under conditions of 3 MPa at 50° C. for 10 seconds. A 200 μm silicone rubber was used as a shock absorber.

In this mounted body, initial electrical resistance and electrical resistance after a thermal humidity test of 85° C. at 85% RH for 500 hours and after a thermal humidity test of 85° C. at 85% RH for 1000 hours were measured. Electrical resistance was measured by using four-terminal sensing with a digital multimeter (Digital Multimeter 7555 manufactured by Yokogawa Meters & Instruments Corporation).

In evaluating initial connection reliability, an initial resistance of less than 3.0Ω was evaluated as passing (P) and an initial resistance of 3.0 K2 or more was evaluated as failing (F). Furthermore, in evaluating connection reliability after thermal humidity testing, a rise in resistance after thermal humidity testing of less than 3% from the initial resistance was evaluated as passing (P), a rise in resistance after thermal humidity testing of 3% or more to less than 15% from the initial resistance were evaluated as intermediate (I) and a rise in resistance after thermal humidity testing of 15% or more from the initial resistance was evaluated as failing (F).

Acrylic Rubbers A Through E

Table 1 shows monomer compositions, glass transition temperatures and weight-average molecular weight of acrylic rubbers A through E.

As the acrylic rubber A, "Acrylic Base LKG1301" manufactured by Fujikurakassei Co. Ltd. was used. The acrylic rubber A is a copolymer obtained by polymerizing n-butyl methacrylate (n-BMA), acrylonitrile (AN), glycidyl methacrylate (GMA) and ethyl acrylate (EA), and has a theoretical glass transition temperature of 35° C. and a weight-average molecular weight of 8.5×10^5.

As the acrylic rubber B, "Teisan Resin SG-P3" manufactured by Nagase ChemteX Corporation was used. The acrylic rubber B is a copolymer obtained by polymerizing butyl acrylate (BA), acrylonitrile (AN), glycidyl methacrylate (GMA) and ethyl acrylate (EA), and has a theoretical glass transition temperature of 12° C. and a weight-average molecular weight of 8.5×10^5.

As the acrylic rubber C, "Teisan Resin SG-280EK23" manufactured by Nagase ChemteX Corporation was used. The acrylic rubber C is a copolymer obtained by polymerizing butyl acrylate (BA), acrylonitrile (AN) and acrylic acid (AA), and has a theoretical glass transition temperature of −29° C. and a weight-average molecular weight of 9.0×10^5.

As the acrylic rubber D, "Teisan Resin WS-023EK30" manufactured by Nagase ChemteX Corporation was used. The acrylic rubber D is a copolymer obtained by polymerizing butyl acrylate (BA), acrylonitrile (AN) and acrylic acid (AA), and has a theoretical glass transition temperature of −10° C. and a weight-average molecular weight of 5.0×10^5.

As the acrylic rubber E, "Teisan Resin SG-7903EK30" manufactured by Nagase ChemteX Corporation was used. The acrylic rubber E is a copolymer obtained by polymerizing butyl acrylate (BA) and acrylonitrile (AN), and has a theoretical glass transition temperature of −32° C. and a weight-average molecular weight of 5.0×10^5.

TABLE 1

|  | monomer composition | Tg [° C.] | Mw [×10^4] |
| --- | --- | --- | --- |
| acrylic rubber A | n-BMA, AN, GMA, EA | 35 | 85 |
| acrylic rubber B | BA, AN, GMA, EA | 12 | 85 |
| acrylic rubber C | BA, AN, AA | −29 | 90 |
| acrylic rubber D | BA, AN, AA, EA | −10 | 50 |
| acrylic rubber E | BA, AN | −30 | 50 |

Example 1

As shown in Table 2, 20 pts. mass of a bisphenol A type epoxy resin (EP-828 manufactured by Japan Epoxy Resins Co., Ltd), 20 pts. mass of a phenoxy resin (YP-50 manufactured by TOHTO Chemical Industry Co., Ltd), 20 pts. mass of a curing agent (Novacure 3941 HP manufactured by Asahi Kasei E-materials Corporation), 10 pts. mass of the acrylic rubber A (Acrylic Base LKG1301 manufactured by Fujikurakassei Co. Ltd.), 15 pts. mass of a butadiene rubber powder (XER-90 manufactured by Kuraray Co., Ltd.) and 1 pt. mass of a silane coupling agent (A-187 manufactured by Momentive Performance Materials Inc.), were blended to constitute an adhesive agent into which were dispersed 5 pts. mass of conductive particles (Micropearl AUL manufactured by Sekisui Chemical Co., Ltd.) having an average particle diameter of 5 urn to manufacture an ACF having a thickness of 25 μm, a width of 1.0 mm and a length of 300 m.

In the ACF of Example 1, blocking was evaluated as P and transmittance at 23° C. was 58% and at 50° C. was 89%. Furthermore, peel strength at the time of re-attachment was evaluated as P, peel strength at the time of temporary bonding was evaluated as P, peel strength one hour after was evaluated as P and peel strength at the time of final pressure bonding was P. Furthermore, connection reliability properties were evaluated as P in the initial test, P after the thermal humidity test with conditions of 85° C. at a humidity of 85% RH for 500 hours and P after the thermal humidity test with conditions of 85° C. at a humidity of 85% for 1000 hours.

Example 2

As shown in Table 2, 20 pts. mass of a bisphenol A type epoxy resin (EP-828 manufactured by Japan Epoxy Resins Co., Ltd), 20 pts. mass of a phenoxy resin (YP-50 manufactured by TOHTO Chemical Industry Co., Ltd), 20 pts. mass of a curing agent (Novacure 3941HP manufactured by Asahi Kasei E-materials Corporation), 10 pts. mass of the acrylic rubber B, (Teisan Resin SG-P3 manufactured by Nagase ChemteX Corporation), 15 pts. mass of a butadiene rubber powder (XER-90 manufactured by Kuraray Co., Ltd.) and 1 pt. mass of a silane coupling agent (A-187 manufactured by Momentive Performance Materials Inc.), were blended to constitute an adhesive agent into which were dispersed 5 pts. mass of conductive particles (Micropearl AUL manufactured by Sekisui Chemical Co., Ltd.) having an average particle diameter of 5 µm to manufacture an ACF having a thickness of 25 µm, a width of 1.0 mm and a length of 300 m.

In the ACF of Example 2, blocking was evaluated as P and transmittance at 23° C. was 60% and at 50° C. was 82%. Furthermore, peel strength at the time of re-attachment was evaluated as P, peel strength at the time of temporary bonding was evaluated as P, peel strength one hour after was evaluated as P and peel strength at the time of final pressure bonding was P. Furthermore, connection reliability properties were evaluated as P in the initial test, P after the thermal humidity test with conditions of 85° C. at a humidity of 85% RH for 500 hours and P after the thermal humidity test with conditions of 85° C. at a humidity of 85% for 1000 hours.

Example 3

As shown in Table 2, 20 pts. mass of a bisphenol A type epoxy resin (EP-828 manufactured by Japan Epoxy Resins Co., Ltd), 20 pts. mass of a phenoxy resin (YP-50 manufactured by TOHTO Chemical Industry Co., Ltd), 20 pts. mass of a curing agent (Novacure 3941 HP manufactured by Asahi Kasei E-materials Corporation), 10 pts. mass of the acrylic rubber C, (Teisan Resin SG-280EK23 manufactured by Nagase ChemteX Corporation), 15 pts. mass of a butadiene rubber powder (XER-90 manufactured by Kuraray Co., Ltd.) and 1 pt. mass of a silane coupling agent (A-187 manufactured by Momentive Performance Materials Inc.), were blended to constitute an adhesive agent into which were dispersed 5 pts mass of conductive particles (Micropearl AUL manufactured by Sekisui Chemical Co., Ltd.) having an average particle diameter of 5 µm to manufacture an ACF having a thickness of 25 µm, a width of 1.0 mm and a length of 300 m.

In the ACF of Example 3, blocking was evaluated as I and transmittance at 23° C. was 71% and at 50° C. was 88%. Furthermore, peel strength at the time of re-attachment was evaluated as I, peel strength at the time of temporary bonding was evaluated as P, peel strength one hour after was evaluated as P and peel strength at the time of final pressure bonding was I. Furthermore, connection reliability properties were evaluated as P in the initial test, P after the thermal humidity test with conditions of 85° C. at a humidity of 85% RH for 500 hours and I after the thermal humidity test with conditions of 85° C. at a humidity of 85% for 1000 hours.

Example 4

As shown in Table 2, 20 pts. mass of a bisphenol A type epoxy resin (EP-828 manufactured by Japan Epoxy Resins Co., Ltd), 20 pts. mass of a phenoxy resin (YP-50 manufactured by TOHTO Chemical Industry Co., Ltd), 20 pts. mass of a curing agent (Novacure 3941HP manufactured by Asahi Kasei E-materials Corporation), 10 pts. mass of the acrylic rubber D, (Teisan Resin WS-023EK30 manufactured by Nagase ChemteX Corporation), 15 pts. mass of a butadiene rubber powder (XER-90 manufactured by Kuraray Co., Ltd.) and 1 pt. mass of a silane coupling agent (A-187 manufactured by Momentive Performance Materials Inc.), were blended to constitute an adhesive agent into which were dispersed 5 pts. mass of conductive particles (Micropearl AUL manufactured by Sekisui Chemical Co., Ltd.) having an average particle diameter of 5 µm to manufacture an ACF having a thickness of 25 µm, a width of 1.0 mm and a length of 300 m.

In the ACF of Example 4, blocking was evaluated as P and transmittance at 23° C. was 60% and at 50° C. was 89%. Furthermore, peel strength at the time of re-attachment was evaluated as P, peel strength at the time of temporary bonding was evaluated as P, peel strength one hour after was evaluated as P and peel strength at the time of final pressure bonding was P. Furthermore, connection reliability properties were evaluated as P in the initial test, P after the thermal humidity test with conditions of 85° C. at a humidity of 85% RH for 500 hours and P after the thermal humidity test with conditions of 85° C. at a humidity of 85% for 1000 hours.

Comparative Example 1

As shown in Table 2, 20 pts. mass of a bisphenol A type epoxy resin (EP-828 manufactured by Japan Epoxy Resins Co., Ltd), 20 pts. mass of a phenoxy resin (YP-50 manufactured by TOHTO Chemical Industry Co., Ltd), 20 pts. mass of a curing agent (Novacure 3941 HP manufactured by Asahi Kasei E-materials Corporation), 10 pts. mass of the acrylic rubber E, (Teisan Resin SG-7903EK30 manufactured by Nagase ChemteX Corporation), 15 pts. mass of a butadiene rubber powder (XER-90 manufactured by Kuraray Co., Ltd.) and 1 pt. mass of a silane coupling agent (A-187 manufactured by Momentive Performance Materials Inc.), were blended to constitute an adhesive agent into which were dispersed 5 pts. mass of conductive particles (Micropearl AUL manufactured by Sekisui Chemical Co., Ltd.) having an average particle diameter of 5 µm to manufacture an ACF having a thickness of 25 µm, a width of 1.0 mm and a length of 300 m.

In the ACF of Comparative Example 1, blocking was evaluated as P and transmittance at 23° C. was 55% and at 50° C. was 55%. Furthermore, peel strength at the time of re-attachment was evaluated as P, peel strength at the time of temporary bonding was evaluated as F, peel strength one hour after was evaluated as F and peel strength at the time of final pressure bonding was P. Furthermore, connection reliability properties were evaluated as P in the initial test, I after the thermal humidity test with conditions of 85° C. at a humidity of 85% RH for 500 hours and I after the thermal humidity test with conditions of 85° C. at a humidity of 85% for 1000 hours.

Comparative Example 2

As shown in Table 2, 20 pts. mass of a bisphenol A type epoxy resin (EP-828 manufactured by Japan Epoxy Resins Co., Ltd), 15 pts. mass of a phenoxy resin (YP-50 manufactured by TOHTO Chemical Industry Co., Ltd), 20 pts. mass of a curing agent (Novacure 3941HP manufactured by Asahi Kasei E-materials Corporation), 15 pts. mass of the acrylic rubber A (Acrylic Base LKG1301 manufactured by Fujikurakassei Co. Ltd.), 15 pts. mass of a butadiene rubber powder (XER-90 manufactured by Kuraray Co., Ltd.) and 1 pt. mass of a silane coupling agent (A-187 manufactured by Momentive Performance Materials Inc.), were blended to constitute an adhesive agent into which were dispersed 5 pts. mass of conductive particles (Micropearl AUL manufactured by Sekisui Chemical Co., Ltd.) having an average particle diameter of 5 µm to manufacture an ACF having a thickness of 25 µm, a width of 1.0 mm and a length of 300 m.

In the ACF of Comparative Example 2, blocking was evaluated as F and transmittance at 23° C. was 90% and at 50° C. was 90%. Furthermore, peel strength at the time of re-attachment was evaluated as F, peel strength at the time of temporary bonding was evaluated as P, peel strength one hour after was evaluated as P and peel strength at the time of final pressure bonding was P. Furthermore, connection reliability properties were evaluated as P in the initial test, P after the thermal humidity test with conditions of 85° C. at a humidity of 85% RH for 500 hours and P after the thermal humidity test with conditions of 85° C. at a humidity of 85% for 1000 hours.

Comparative Example 3

As shown in Table 2, 20 pts. mass of a bisphenol A type epoxy resin (EP-828 manufactured by Japan Epoxy Resins Co., Ltd), 25 pts. mass of a phenoxy resin (YP-50 manufactured by TOHTO Chemical Industry Co., Ltd), 15 pts. mass of a curing agent (Novacure 3941 HP manufactured by Asahi Kasei E-materials Corporation), 5 pts. mass of the acrylic rubber A (Acrylic Base LKG1301 manufactured by Fujikurakassei Co. Ltd.), 15 pts. mass of a butadiene rubber powder (XER-90 manufactured by Kuraray Co., Ltd.) and 1 pt. mass of a silane coupling agent (A-187 manufactured by Momentive Performance Materials Inc.), were blended to constitute an adhesive agent into which were dispersed 5 pts. mass of conductive particles (Micropearl AUL manufactured by Sekisui Chemical Co., Ltd.) having an average particle diameter of 5 μm to manufacture an ACF having a thickness of 25 μm, a width of 1.0 mm and a length of 300 m.

In the ACF of Comparative Example 3, blocking was evaluated as P and transmittance at 23° C. was 57% and at 50° C. was 57%. Furthermore, peel strength at the time of re-attachment was evaluated as P, peel strength at the time of temporary bonding was evaluated as F, peel strength one hour after was evaluated as F and peel strength at the time of final pressure bonding was P. Furthermore, connection reliability properties were evaluated as P in the initial test, I after the thermal humidity test with conditions of 85° C. at a humidity of 85% RH for 500 hours and I after the thermal humidity test with conditions of 85° C. at a humidity of 85% for 1000 hours.

In Comparative Example 1, inadequate compatibility between the epoxy resin and the acrylic rubber during temporary pressure bonding caused by the absence of a carboxyl group or a glycidyl group in the acrylic rubber E led to insufficient adhesive force. Additionally, in Comparative Example 2, excessive blending amount of the acrylic rubber caused a low critical temperature for compatibility/phase-separation wherein a compatible state occurs at both 23° C. and 50° C. such that a phase transition does not occur. Consequently, adhesive force at the normal temperature was excessive which degraded blocking properties and re-attachment properties. Additionally, in Comparative Example 3, insufficient blending amount of the acrylic rubber caused a high critical temperature for compatibility/phase-separation wherein a phase-separated state occurs at both 23° C. and 50° C. such that a phase transition does not occur. Consequently, adhesive force was insufficient during temporary bonding.

Contrastingly, in Examples 1 to 4, the acrylic rubber had a carboxyl or a glycidyl group leading to excellent compatibility between the epoxy resin and the acrylic rubber during temporary pressure bonding which improved blocking properties and temporary pressure bonding properties. Furthermore, after temporary pressure bonding, it was found to be possible to maintain adhesive force for one hour or more.

REFERENCE SIGNS LIST 1 film roll, 2 adhesive film, 3 reel, 10 roll core, 11 flange

The invention claimed is:
1. A film roll comprising:
an adhesive film comprising a phenoxy resin, an epoxy resin, a latent curing agent, an acrylic rubber having a carboxyl group or a glycidyl group, and a butadiene rubber, in which the acrylic rubber phase-separates from the epoxy resin at a normal temperature of 20° C.±15° C. and is compatible with the epoxy resin at a predetermined temperature of 40 to 80° C.; and
a reel in which the adhesive film is wound around a roll core,
wherein the epoxy resin is a bisphenol-type epoxy resin,

TABLE 2

| | | Ex. 1 | Ex. 2 | Ex. 3 | Ex. 4 | Com. 1 | Com. 2 | Com. 3 |
|---|---|---|---|---|---|---|---|---|
| | epoxy resin | 20 | 20 | 20 | 20 | 20 | 20 | 20 |
| | phenoxy resin | 20 | 20 | 20 | 20 | 20 | 15 | 25 |
| | curing agent | 20 | 20 | 20 | 20 | 20 | 20 | 20 |
| | acrylic rubber A | 10 | — | — | — | — | 15 | 5 |
| | acrylic rubber B | — | 10 | — | — | — | — | — |
| | acrylic rubber C | — | — | 10 | — | — | — | — |
| | acrylic rubber D | — | — | — | 10 | — | — | — |
| | acrylic rubber E | — | — | — | — | 10 | — | — |
| | butadiene rubber powder | 15 | 15 | 15 | 15 | 15 | 15 | 15 |
| | silane coupling agent | 1 | 1 | 1 | 1 | 1 | 1 | 1 |
| | conductive particle | 5 | 5 | 5 | 5 | 5 | 5 | 5 |
| blocking | 30° C., 50 g load | P | P | I | P | P | F | P |
| light transmittance | 23° C. transmittance [%] | 58 | 60 | 71 | 60 | 55 | 57 | 57 |
| | 50° C. transmittance [%] | 89 | 82 | 88 | 89 | 55 | 90 | 90 |
| re-attachment | 23° C. pressure bonding peel strength | P | P | I | P | P | F | P |
| temporary pressure bonding | peel strength at temporary pressure bonding | P | P | P | P | F | P | F |
| delayed tack | peel strength one hour after temporary pressure bonding | P | P | P | P | F | P | F |
| final pressure bonding | peel strength at final pressure bonding | P | P | I | P | P | P | P |
| connection reliability | initial | P | P | P | P | P | P | P |
| | 85° C. 85%, 500 h | P | P | P | P | I | P | I |
| | 85° C. 85%, 1000 h | P | P | I | P | I | P | I | wherein the latent curing agent is an imidazole-type latent curing agent, wherein the acrylic rubber content is 40 pts. mass or more and 60 pts. mass or less with respect to 100 pts. mass of epoxy resin, wherein the latent curing agent is a microcapsule type, and wherein the latent curing agent content is 80 pts. mass or more and 120 pts. mass or less with respect to 100 pts. mass of epoxy resin.

2. A method for manufacturing a connecting structure for connecting an electronic component comprising:

temporary pressure bonding in which an adhesive film comprising a phenoxy resin, an epoxy resin, a latent curing agent, an acrylic rubber having a carboxyl group or a glycidyl group, and a butadiene rubber, wherein the acrylic rubber phase-separates from the epoxy resin at a normal temperature of 20° C.±15° C. and is compatible with the epoxy resin at a predetermined temperature of 40 to 80° C. is held between a first electronic component and a second electronic component at the predetermined temperature; and final pressure bonding of the first electronic component and the second electronic component at a temperature of 160 to 210° C., wherein the epoxy resin is a bisphenol-type epoxy resin, wherein the latent curing agent is an imidazole-type latent curing agent, wherein the acrylic rubber content is 40 pts. mass or more and 60 pts. mass or less with respect to 100 pts. mass of epoxy resin, wherein the latent curing agent is a microcapsule type, and wherein the latent curing agent content is 80 pts. mass or more and 120 pts. mass or less with respect to 100 pts. mass of epoxy resin.

3. The method for manufacturing a connecting structure for connecting an electronic component according to claim 2, wherein the adhesive film comprises conductive particles.

4. The method for manufacturing a connecting structure for connecting an electronic component according to claim 2, wherein the acrylic rubber has a glass transition temperature of 50° C. or less.

5. The method for manufacturing a connecting structure for connecting an electronic component according to claim 2, wherein a transmittance of the adhesive film at the normal temperature is lower than a transmittance thereof at the predetermined temperature.

* * * * *